United States Patent [19]

Omori et al.

[11] 4,243,008
[45] Jan. 6, 1981

[54] METHOD FOR CONTROLLING IGNITION TIMING OF INTERNAL COMBUSTION ENGINE

[75] Inventors: Norio Omori; Hideya Fujisawa, both of Kariya; Yutaka Kawashima, Okazaki; Masakazu Ninomiya, Kariya; Hisasi Kawai, Toyohashi; Takeshi Matsui, Aichi, all of Japan

[73] Assignees: Nippondenso Co., Ltd., Kariya; Nippon Soken, Inc., Nishio, both of Japan

[21] Appl. No.: 1,208

[22] Filed: Jan. 5, 1979

[30] Foreign Application Priority Data

Feb. 1, 1978 [JP] Japan ................................ 53/10319

[51] Int. Cl.³ ............................................... F02P 5/04
[52] U.S. Cl. ...................................... 123/425; 123/416
[58] Field of Search ........... 123/117 R, 117 D, 148 E, 123/146.5 A, 119 ED; 73/35

[56] References Cited

U.S. PATENT DOCUMENTS

| | | | |
|---|---|---|---|
| 4,002,155 | 1/1977 | Harned et al. | 123/148 E |
| 4,120,272 | 10/1978 | Douaud et al. | 123/148 E X |
| 4,153,020 | 5/1979 | King et al. | 123/148 E X |
| 4,161,162 | 7/1979 | Latsch et al. | 123/32 EA |

*Primary Examiner*—Tony M. Argenbright
*Attorney, Agent, or Firm*—Cushman, Darby & Cushman

[57] ABSTRACT

A method of detecting knocking intensity of an internal combustion engine uses a detector for detecting vibration propagated within the engine and a first calculation circuit for obtaining an average value of vibration sensed by the vibration detector within a predetermined crank angle before the top dead center, and in which knocking is identified when the ratio between the above average value and the maximum value of vibration after the top dead center exceeds a predetermined value. This method also uses a second calculation circuit for obtaining a further average value of vibration detected by the vibration detector within a predetermined crank angle after the top dead center of the internal combustion engine, and a knocking discrimination circuit for generating a knocking indication output corresponding to the ratio between the average value of vibration before the top dead center obtained by said first calculation circuit and the average value of vibration after the top dead center by said second calculation circuit.

4 Claims, 13 Drawing Figures

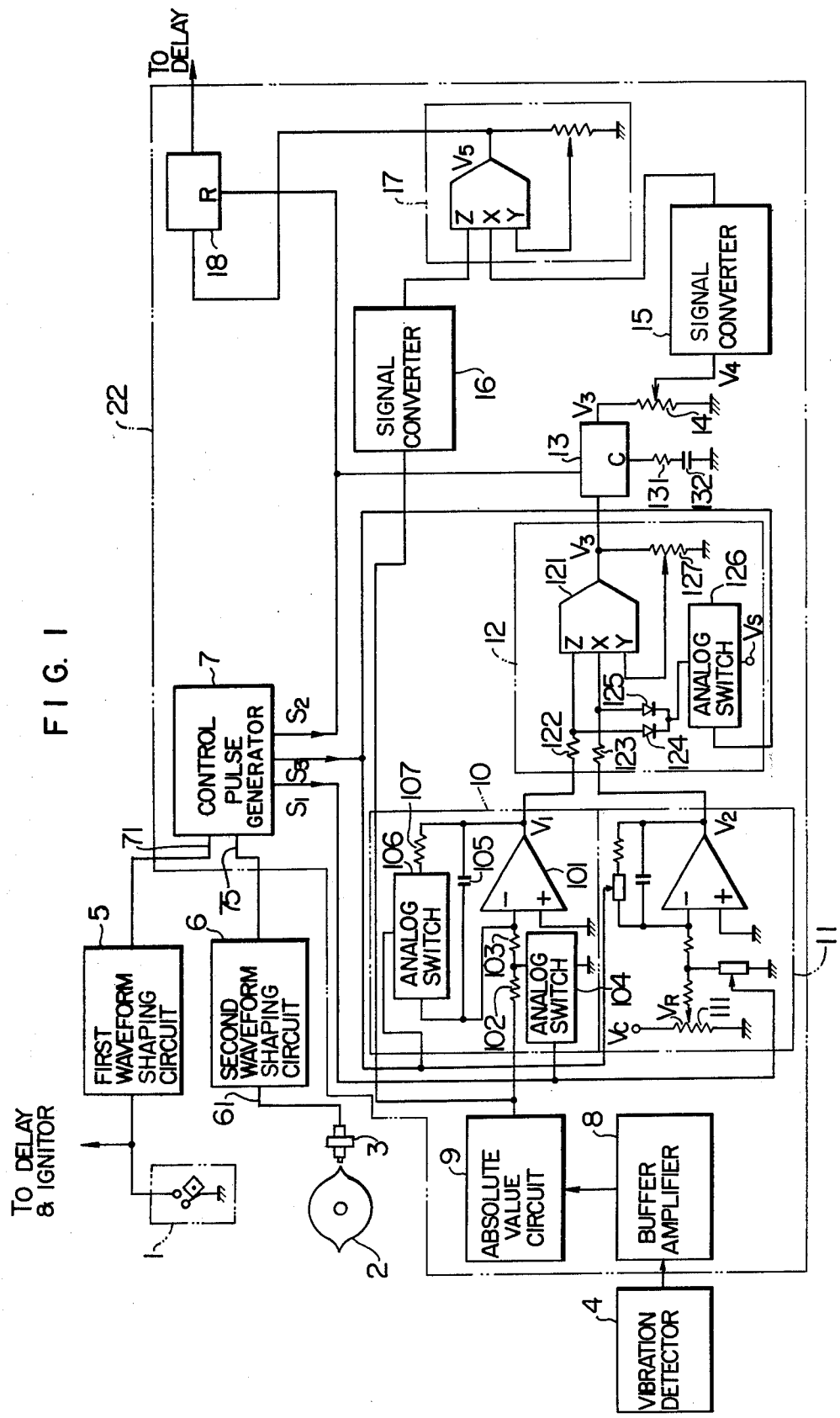
F I G. 1

METHOD FOR CONTROLLING IGNITION TIMING OF INTERNAL COMBUSTION ENGINE

BACKGROUND OF THE INVENTION

1. FIELD OF THE INVENTION

This invention relates to a method of detecting a knocking within an internal combustion engine for varying the retard angle depending on the knocking intensity, and controlling the ignition timing of the engine.

2. DESCRIPTION OF THE PRIOR ART

In a conventionally known knocking detection method, as disclosed in U.S. Pat. No. 4,002,155, the output of a vibration detection apparatus is sampled within a constant period after ignition, low and high reference values are set from the average value, and the number of detection of vibration whose amplitude exceeds these reference values are counted thereby to discriminate the presence of knocking.

However, the prior art method in which only the number of vibration crossing the reference values are detected, has a drawback that the intensity of knocking can not be detected.

SUMMARY OF THE INVENTION

The knocking intensity perceived acoustically by auditory sense corresponds well to the maximum value of vibration (G peak). Therefore, in this invention, as a representative value of vibration of an engine stage determined by the number of revolutions of the engine and the load of engine, the average value $$\left( \frac{\int_{Ig}^{TDC} G \, dt}{T} \right)$$

of vibration (G) in the period (T) from the ignition time (Ig) and the top dead center (TDC) is chosen and this average value is compared with the maximum value (G peak) of vibration after the top dead center. Namely, knocking is identified when $$G_{peak} / \{ \int_{Ig}^{TDC} G \, dt / T \}$$

exceeds a prescribed value. Since the intensity of knocking becomes larger as $$G_{peak} / \{ \int_{Ig}^{TDC} G \, dt / T \}$$

increases, the ignition time can be controlled in accordance with the intensity of knocking by increasing the retard angle in proportion to $$G_{peak} / \{ \int_{Ig}^{TDC} G \, dt / T \}.$$

Thus, the aim of this invention is to provide a method of detecting a knocking and controlling an ignition timing for an internal combustion engine which is capable of reducing the knocking level as sensed by ear and adjusting the ignition advance angle at a value suitably distant from a point of knocking.

Furthermore, when the intensity of knocking perceived acoustically is large, the vibration output determined by combustion increases nearly proportionally to $G_{peak}$, and hence corresponds well to the integral value (an average value)

$$\int_{TDC}^{T_o} |G| \, dt$$

of vibration generated after the top dead center position. So, according to this invention, a knocking is identified when the ratio $$A = \int_{TDC}^{T_o} |G| \, dt / \int_{Ig}^{TDC} |G| \, dt$$

exceeds a predetermined value, and the retard angle for the ignition time is controlled in accordance with the knocking intensity by the value of A. The value of $$\int_{TDC}^{\theta_o} |G| \, d\theta / T_\theta,$$

where $\theta_o$ is the upper limit of the integral equation and $T_\theta$ is the integration period, can be calculated before a next ignition starts. Therefore, the aim of this invention is to provide a method of detecting knocking and controlling an ignition timing for an internal combustion engine capable of determining the ignition time for succeeding combustions.

BRIEF DESCRIPTION OF THE DRAWING

FIG. 1 is an electric circuit diagram according to the first embodiment of a knocking detection apparatus according to this invention.

DESCRIPTION OF THE PREFERRED EMBODIMENT

Figure 2:
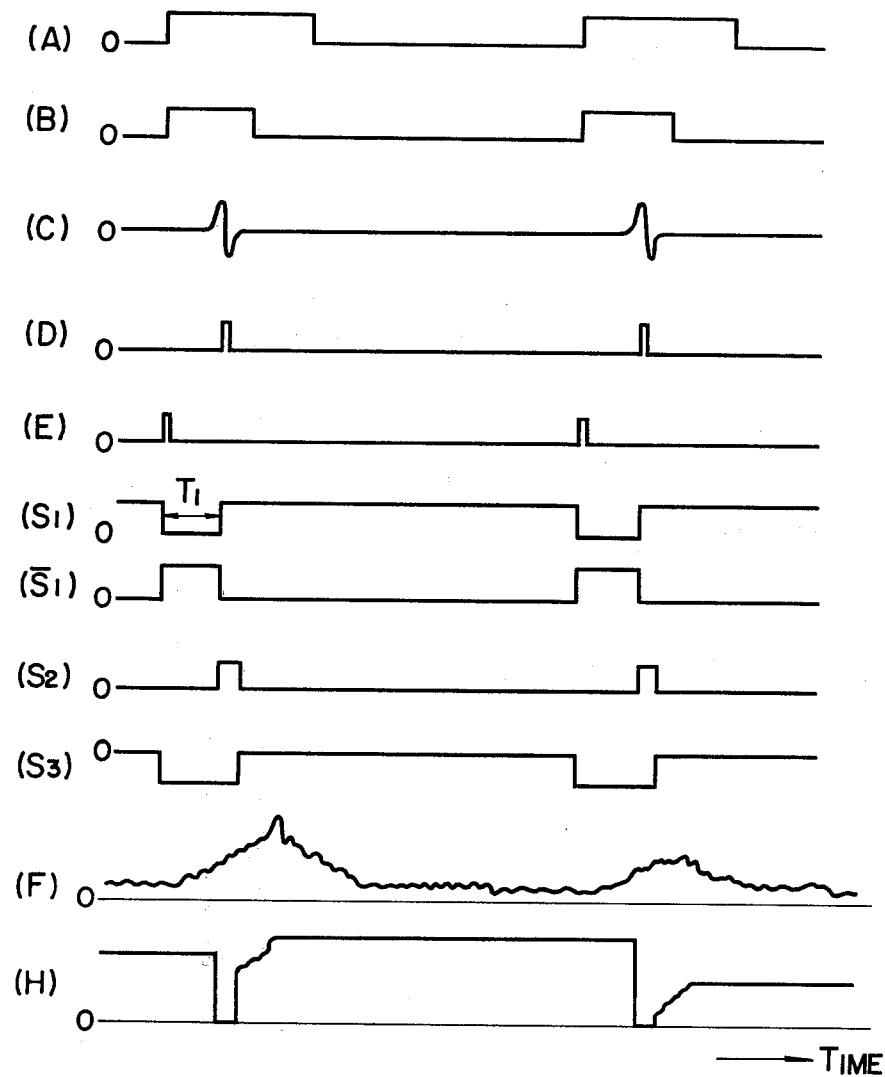
FIG. 2 shows waveforms of various parts of the apparatus in FIG. 1 for the explanation of the operation thereof.

The first embodiment of this invention will be explained next, where identification of knocking is made through calculation of $$K|G| \div \frac{\int_0^{T_1} |G|\, dt}{T_1}.$$

Consider first the case when the invention is applied to a four-cylinder internal combustion engine. In FIG. 1, the reference numeral 1 designates a contact point attached to a distributor and connected to an ignitor (not shown). Numeral 2 is a rotary disk fixed to a crank shaft. The disk has two protrusions opposite to each other, which correspond to the top dead center of each cylinder piston of the internal combustion engine. Numeral 3 is an electromagnetic pick-up which generates a signal when it is opposed to the protrusions of the disk 2. Numeral 4 designates a vibration detector made of a piezoelectric element and mounted on an engine block to convert the acceleration of vibration of the engine block into an electric signal. Numeral 5 designates a first waveform shaping circuit which is a publicly known circuit comprising a circuit for preventing chattering of the contact point 1. FIG. 2(A) shows the waveform at the point 1, while FIG. 2(B) shows the output waveform of the first waveform shaping circuit 5. At the rising part of the waveform of FIG. 2(A), ignition is initiated by an ignitor (not shown). Numeral 6 designates a second waveform shaping circuit, which varies the waveform of the output signal of the electromagnetic pick-up 3. FIG. 2(C) shows the output signal of the electromagnetic pick-up 3, while FIG. 2(D) shows the output signal of the second waveform shaping circuit 6.

Figure 3:
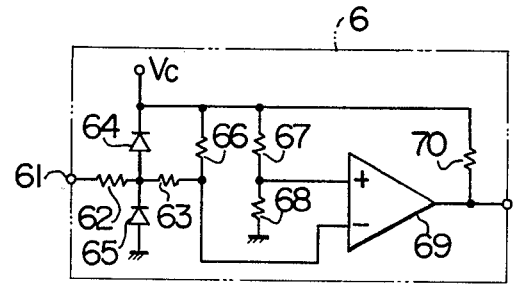
FIGS. 3 and 4 are detailed electric circuit diagrams of main parts of the apparatus shown in FIG. 1.

The internal circuit of the second waveform shaping circuit 6 is shown in FIG. 3. The reference numeral 61 designates an input terminal. One end of a resistor 62 is connected to the terminal 61, while the other end thereof is connected in common with a resistor 63, a positive pole of a diode 64 and a negative pole of a diode 65. The other end of the resistor 63 is connected to an inverting input terminal of a comparator 69, IC 3302 of Motorola Company. A constant voltage Vc is supplied to the negative pole of the diode 64. The positive pole of the diode 65 is grounded. One end of a resistor 66 is connected to the other end of the resistor 63, while the other end of the resistor 66 is connected to the negative pole of the diode 64. One end of a resistor 67 is connected to the negative pole of the diode 64 while the other end thereof is connected to the one end of a resistor 68. The other end of the resistor 68 is grounded. A connection point between the resistors 67 and 68 is connected to a non-inverting input terminal of the comparator 69. The output terminal of the comparator 69 is an open-collector, so that a resistor 70 is connected between the output terminal and the power supply Vc. The value of the resistors are determined in such a manner that the impedance seen from the non-inverting input terminal of the comparator 69 to the resistor side is made equal to the impedance seen from the inverting input terminal to the resistor side. Furthermore, the non-inverting input terminal of the comparator 69 has a potential of about ⅓ Vc. Therefore, when the electromagnetic pick-up 3 is connected to the input terminal 61, the inverting input terminal of the comparator has also a potential of about ⅓ Vc. The diode 65 prevents any application of a negative voltage below $-0.5$ V to the inverting input terminal, while the diode 64 prevents any application of a positive voltage above $+(V_c+0.5 \text{ V})$ to the inverting input terminal. Every time the protrusions of the disk 2 are driven and pass the electromagnetic pick-up 3, the waveform as shown in FIG. 2(C) is generated. This accompanies generation of the waveform shown in FIG. 2(D) at the output of the comparator 69. The pulse of FIG. 2(D) appears at the top dead center (TDC) of each cylinder.

Figure 4:
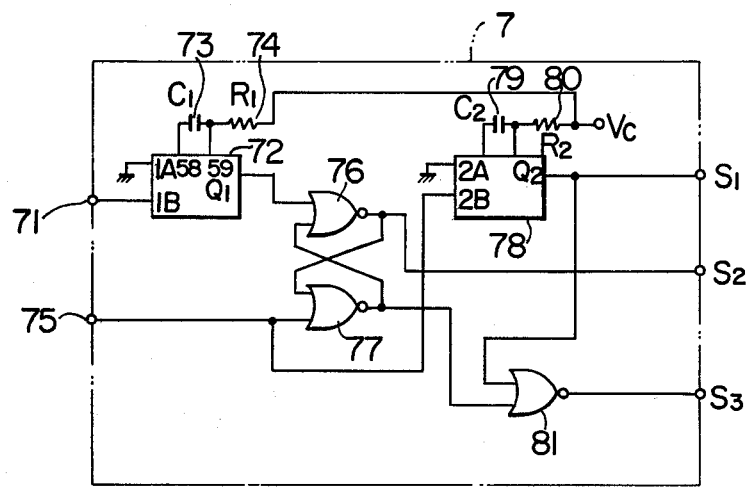

The reference numeral 7 designates a control pulse generating circuit whose internal circuit is as shown in FIG. 4. An input terminal 71 is connected to the first waveform shaping circuit 5 and also to an input terminal 1B of a monostable multivibrator 72 of Texas Instruments Company, under the designation IC SN74123. The other input terminal 1A is grounded. By connecting a capacitor 73 between terminals 58 and 59 of the multivibrator 72 and a resistor 74 between the terminal 59 and a power supply Vc, a pulse with a pulse width of about 10 μsec, determined by the capacitor 73 and the resistor 74 as shown in FIG. 2(E) is generated at $Q_1$ after a rise of the output of the first waveform shaping circuit 5. By connecting NOR gates 76 and 77 to form an R-S flip-flop, connecting one input terminal of the NOR gate 76 to the $Q_1$ output of the monostable multivibrator 72, connecting the other input terminal of the NOR gate 77 to an input terminal 75 of the control pulse generating circuit 7 and connecting the input terminal 75 to the output terminal 75 of the second waveform shaping circuit 6, the waveforms of FIG. 2($S_1$) and FIG. 2($S_1$) are generated by the NOR gate 76 and 77 respectively. An input terminal 2B of a monostable multivibrator 78 is connected to the input terminal 75. The operation of the multivibrator 78 is the same as that of the multivibrator 72. That is, a pulse of a pulse width of about 100 μsec determined by a capacitor 79 and a resistor 80 is generated at the $Q_2$ output terminal after a rise of the output of the second waveform shaping circuit 6, as shown in FIG. 2($S_2$). By connecting the one input of a two-input NOR gate 81 to the output terminal $Q_2$ and the other input thereof to the output of the NOR gate 77 of the R-S flip-flop, the output of the NQR gate 81 becomes as shown in FIG. 2($S_3$). Signals at the output terminals $S_1$, $S_2$ and $S_3$ of the control pulse generating circuit 7 become as shown in FIGS. 2($S_1$), ($S_2$) and ($S_3$) respectively.

The reference numeral 8 designates a buffer amplifier which converts the output signal of the vibration detector 4 into a low impedance signal without changing the voltage waveform. 9 designates an absolute-value circuit which transfers the minus side of the vibration waveform to the plus side. Since this circuit is publicly well-known, explanation of it is omitted.

The reference numeral 10 designates a first integrator. In series with the output terminal of the absolute-value circuit 9, resistors 102 and 103 are connected in this order. The one end of the resistor 103 is connected to the inverting input terminal of an operational amplifier 101. An analog switch 104 is connected between a connection point between the resistors 102 and 103 and the earth. The $S_1$ signal is applied to a control input of the analog switch 104. A capacitor 105 is connected between the inverting input and the output of the operational amplifier 101. An analog switch 106 and a resistor 107 are connected in series across the capacitor 105. The output signal $S_3$ of the control pulse generating circuit 7 is applied to the control input of the analog switch 106. The operation of the first integrator in the above construction is as follows. When the signal $S_1$ is "1", the analog switch 104 is conductive. Due to application of the S₃ signal to the analog switch 106, when S₃ is "1", the analog switch 106 is conductive. Hence, the output of the first integrator 10 becomes 0V. When the output signal S₁ becomes "0", the analog switch 104 opens. At the same time, the analog switch is also made to open by the output signal S₃. Hence, the first integrator 10 starts integration in the minus direction. The integration period continues till the analog switch 106 closes. Actually, since the output of the absolute value circuit 9 is introduced only when the analog switch 104 is open, the integration period continues till the top dead center (TDC). Thus, the hold period of the first integration circuit 10 is given by the period when the signal of FIG. 2(S₂) is "1". The output voltage V₁ of the first integrator 10 becomes $$-\int_0^{T_1} |G|\, dt.$$

The second integrator 11 is constructed in a similar way to that of the first integrator 10 except that a variable resistor 111 is provided additionally to afford a constant voltage $V_R$ as an input. A constant voltage $V_c$ from a power supply is supplied to a fixed terminal of the variable resistor 111, while the other fixed terminal is grounded. The second integrator 11 integrates the input voltage $V_R$ during a period $T_1$ if the signal of FIG. 2(S₁) is "0", so that the output voltage $$V_2 = -\int_0^{T_1} V_R\, dt$$

is proportional to the period $T_1$.

A divider 12 is formed by using a multiplier 121 capable of dividing calculation, i.e. IC8013 of Intersil Company. The Z input of the multiplier 121 is connected to the output of the first integrator 10 through a resistor 122. The X input is connected to the output of the second integrator 11 through a resistor 123. A diode 124 connects its positive pole to the Z input and its negative pole to one terminal of an analog switch 126. A diode 125 connects its positive pole to the X input and its negative pole to the one terminal of the analog switch 126. To another terminal of the analog switch 126 is supplied a negative voltage $-V_S$ from a power supply. The signal S₃ from the control pulse generating circuit 7 is applied to a control terminal of the analog switch 126. The output of the multiplier 121 is connected to a fixed terminal of a variable resistor 127, the other terminal of which is grounded. A movable terminal of the resistor 127 is connected to Y terminal of the multiplier 127. The operation of the divider 12 in the above construction is as follows. When the signal (S₃) is "1", the analog switch 126 is closed. So, a current flows from the output of the first integrator 10 through the resistor 122, the diode 124 and the analog switch 126. As a result, a negative voltage is applied to the Z input of the multiplier 121. Likewise, a current flows from the output of the second integrator 11 through the resistor 123, the diode 125 and the analog switch 126. Hence, a negative voltage is applied to the X input of the multiplier 121. The resistors 122 and 123, the diodes 124 and 125 and the analog switch 126 are necessary because the Z and X inputs of the multiplier 121 should be supplied with a negative voltage. Next, when the signal S₃ is "0", the analog switch 126 opens. So, the outputs of the first integrator 10 and the second integrator 11 are applied through the resistor 122 and 123 to the Z and X input respectively. Thus, the output of the divider 12 becomes 10Z/X. Through a dividing calculation, the output of the divider 10, when the S₂ signal is "1", becomes $$V_3 = 10 \left(-\int_0^{T_1} |G|\, dt \div \left(\int_0^{T_1} V_R dt\right)\right) = \frac{K_1 \int_0^{T_1} |G|\, dt}{T_1},$$

where $V_3$ is a positive voltage and $K_1$ is a constant.

A sample and hold circuit 13 is formed by a device under the designation 1H5110 of Intersil Company. The output of the divider 121 is applied to the analog input of the circuit 13 while the signal S₂ from the control pulse generating circuit 7 is applied to the control input of the circuit 13. Further, a resistor 131 and a capacitor 132 are connected in series with the C-terminal. In this circuit construction, the output voltage of the divider 12, when the signal S₂ is "1", is sampled and held. Thus, the output of the sample and hold circuit 13 becomes equal to the output voltage $V_3$ of the divider 12, i.e.

$$K_1 \int_0^{T_1} |G|\, dt/T_1$$

which is the average of the vibration taken from the ignition to the top dead center (TDC) and multiplied by the constant. One fixed terminal of a variable resistor 14 is connected to the output of the sample and hold circuit 13, while the other fixed terminal is grounded. By this connection, the voltage $V_4$ at a movable terminal of the resistor 14 becomes $$K_1 \cdot K_2 \int_0^{T_1} |G|\, dt/T_1,$$

where $K_2$ is a voltage dividing ratio given by the variable resistor 14. By choosing $K_3 = K_1 \times K_2$, $V_4$ is given by $$K_3 \int_0^{T_1} |G|\, dt/T_1.$$

Thus, $V_4$ represents also the average value like $V_3$.

The reference numeral 15 designates a signal converter or inverter whose input and output are connected to the movable terminal of the resistor 14 and X input of the later mentioned divider 17 respectively. The signal converter 15 changes the sign of $V_4$, i.e. its output is given by $$-K_3 \int_0^{T_1} |G|\, dt/T_1.$$

No explanation of the signal converter is made here, as it is a publicly known inverting amplifier with a unity gain.

The reference numeral 16 designates also a signal converter having the same construction as that of the signal converter 15. The input to the converter 16 is connected to the output of the absolute value circuit 9, while the output is connected to Z input of a later mentioned divider 17. The signal converter 16 changes the sign of the input voltage $|G|$, i.e. its output is given by $-|G|$. The reason for the presence of signal converters 15 and 16 is that X and Z inputs of the later-mentioned divider 17 require a negative voltage. If the divider 17 could accept a positive voltage at its X and Z inputs, the signal converters 15 and 16 would not be necessary.

The reference numeral 17 designates a divider which has a similar circuit construction to that of the aforementioned divider 12 except that the resistors 122 and 123, the diodes 124 and 125, and the analog switch 126 are omitted. The operation of the divider 17 is to give an output $10Z/X$ for the Z and X inputs. So, the output voltage $V_5$ is given by $$K_4 |G| \div K_3 \int_o^{T_1} |G| \, dt/T_1$$

$$= K|G| \div ( \int_o^{T_1} |G| \, dt / T_1),$$

where $K=K_4 \approx K_3$. $K_4$ is a proportional constant. FIG. 2(F) shows the waveform of $V_5$.

The reference numeral 18 designates a peak value hold circuit, which is reset by the signal of FIG. 2($S_2$) and holds a peak value after the reset. The waveform of this peak value hold circuit is as shown in FIG. 2(H).

Therefore, an analog output proportional to the intensity of knocking is obtained by the peak value hold circuit 18. The analog output is used, for example, to vary the delay time of a delay circuit (not shown) which is operated with the opening operation of the contact point 1, and the ignitor is actuated by the output of the delay circuit to cause ignition of the ignition plug, whereby the retard of the ignition timing can be controlled in accordance with the knocking intensity.

A second embodiment will be explained next, in which knocking is discriminated through calculation of $$\int_o^{T_2} |G| \, dt \div K \int_o^{T_1} |G| \, dt / T_1.$$

Figure 5:
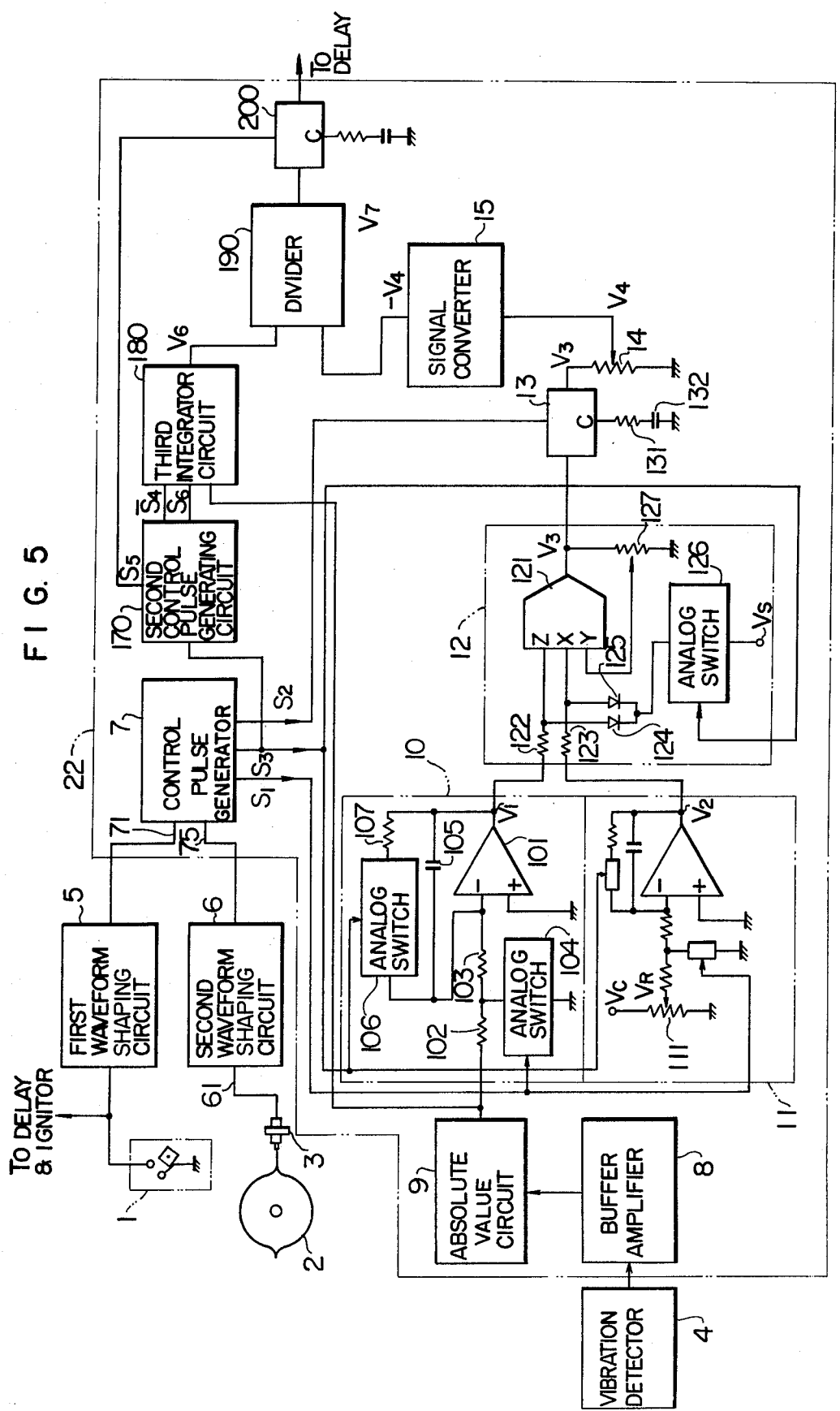
FIG. 5 is an electric circuit diagram showing the second embodiment of a knocking detection apparatus according to this invention.

In FIG. 5, a contact point 1, a rotary disk 2, a pick-up 3, a vibration detector 4, a first waveform shaping circuit 5, a second waveform shaping circuit 6, a control pulse generating circuit 7, a buffer amplifier 8, an absolute-value circuit 9, a first integrator circuit 10, a second integrator circuit 11 a divider 12, a sample and hold circuit 13, and a signal converter 15 are the same as those of FIG. 1. So, no explanation is made of them.

Figure 6:
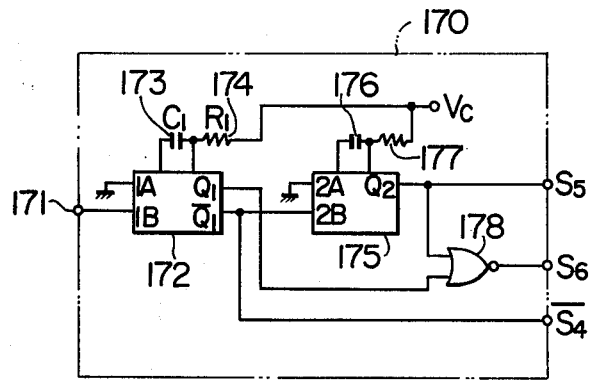
FIG. 6 is a detailed electric circuit diagram of the main part of the apparatus in FIG. 5.
Figure 7:
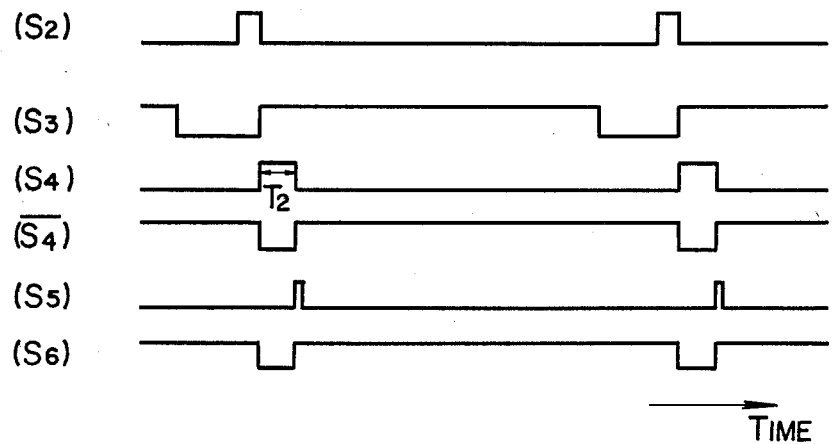
FIG. 7 shows waveforms of various parts of the circuit in FIG. 6 for the explanation of the operation thereof.

The reference numeral 170 designates a second control pulse generating circuit whose detailed circuit is shown in FIG. 6. Its input terminal 171 is connected to the $S_3$ output of the control pulse generating circuit and also to the input 1B of a monostable multivibrator of Texas Instruments Company, under the designation SN74123. This IC generates an output with a pulse width of about 400 μsec determined by a capacitor 173 and a resistor 174 at the output $Q_1$, as shown in FIG. 7($S_4$). An inverted output is generated at $\overline{Q}_1$, as shown in FIG. 7($\overline{S}_4$).

The input 2B of a monostable multivibrator 175 is connected to the $\overline{Q}_1$ output of the monostable multivibrator 172 while its input 2A is grounded. The operation of the monostable multivibrator 175 is similar to that of the monostable multivibrator 172. That is, after the $\overline{Q}_1$ output of the monostable multivibrator 172 has risen, the monostable multivibrator 175 generates its output with a pulse width of about 100 μsec determined by a capacitor 176 and a resistor 177 at the $Q_2$ output, as shown in FIG. 7($S_5$). By connecting one input of a two-inputs NOR gate 178 to the $Q_1$ output of the monostable multivibrator 172 and the other input of the NOR gate 178 to the $Q_2$ output of the monostable multivibrator 175, the NOR gate 178 generates an output with a waveform as shown in FIG. 7($S_6$). Output terminals $\overline{S}_4$, $S_5$ and $S_6$ correspond to signals ($\overline{S}_4$), ($S_5$) and ($S_6$) in FIG. 7 respectively.

The reference numeral 180 designates a third integrator circuit having the same circuit construction as that of the first integrator circuit 10 except circuit constants. The output $\overline{S}_4$ of the second control pulse generating circuit 170 is connected to the control input of an analog switch of the third integration circuit 180, which corresponds to the analog switch 104 of the first integrator circuit 10. The output $S_6$ is connected to the control input of the other analog switch of the third integrator circuit 180, which corresponds to the analog switch 106 of the first integrator circuit 10. Furthermore, the integrating input is connected to the output of the absolute-value circuit 9. Since the operation of this third integration circuit is the same as that of the first integration circuit, no explanation of it will be made. If we assume that the pulse width of $S_4$ is $T_2$, the output $V_6$ of the third integration circuit 180 becomes $$- \int_o^{T_2} |G| \, dt.$$

The reference numeral 190 designates a divider similar to the aforementioned divider 12 except that the resistors 122 and 123, the diodes 124 and 125 and the analog switch 126 are absent. The Z input of the divider 190 is connected to the output of the third integrator 180, while its X input is connected to the output of the signal converter 15. Thus, the output $V_7$ of the divider 190 is given by $$\int_o^{T_2} |G| \, dt \div K \int_o^{T_1} |G| \, dt / T_1.$$

The reference numeral 200 denotes a sample and hold circuit which is the same as the sample and hold circuit 13. It samples during the period of $S_5$ and holds during the other period. The period when the divider 190 yields an output $$\int_o^{T_2} |G| \, dt \div K \int_o^{T_1} |G| \, dt / T_1$$

is only the period of signal $S_5$ as shown in FIG. 7 ($S_5$).

In this manner, the sample and hold circuit 200 yields an analog output depending on the knocking intensity.

Figures 8, 9:
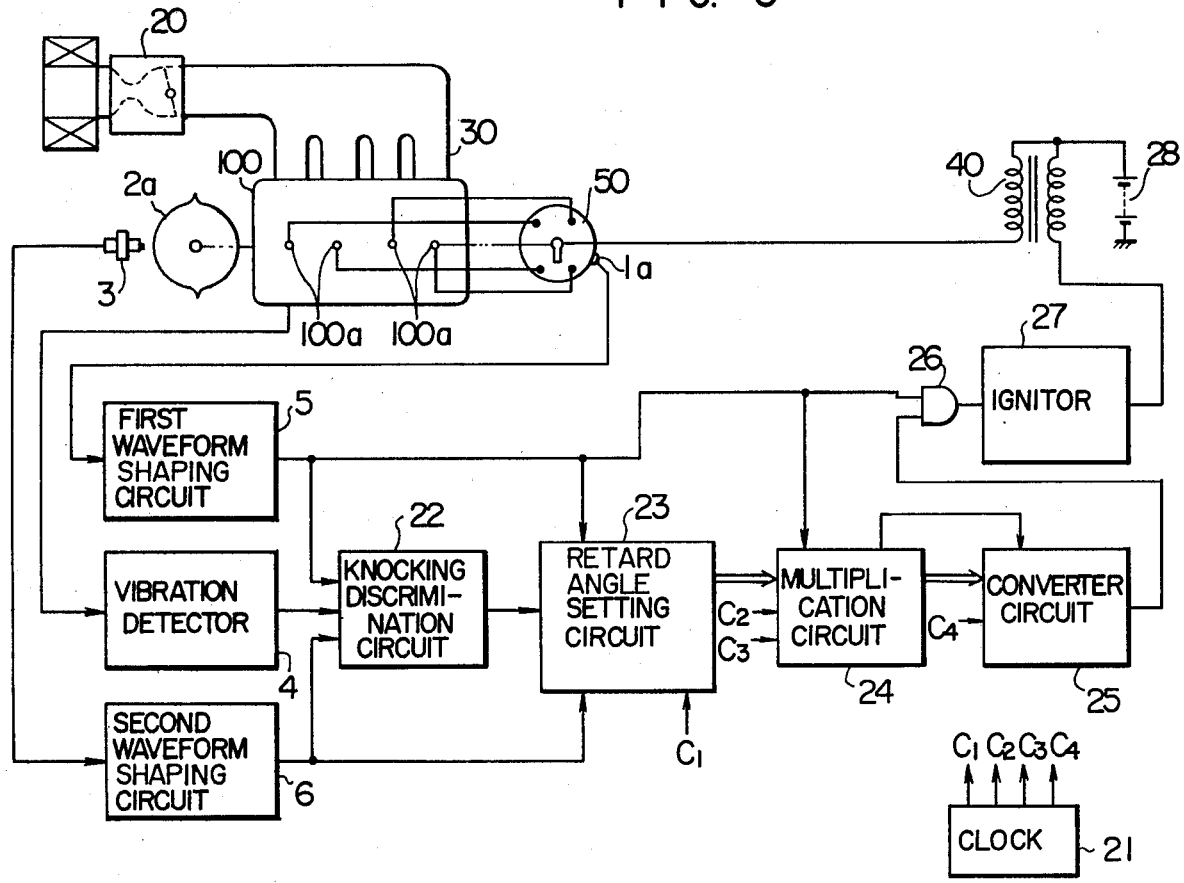
FIG. 8 is an electric circuit diagram showing one embodiment of an ignition time controlling apparatus of this invention.
FIGS. 9, 11, and 13 are electric circuit diagrams of main parts of the apparatus in FIG. 8, and FIGS. 10 and 12 show waveforms for the explanation of the operation of the circuits shown in FIGS. 9 and 10.

Next, another embodiment will be explained, where the knocking detection circuit as shown in FIGS. 1 and 5 is applied to an ignition time adjusting apparatus. In FIG. 8, like reference numerals are used to denote like parts as shown in FIG. 1.

The internal combustion engine 100 is a well-known 4-cylinder 4-cycle spark ignition type engine. The mixed gas formed in a carburetor 20 is sucked through a suction manifold 30. A high voltage is applied to ignition plugs 100a through a distributor 50 from an ignition coil. The reference numeral 1a designates a point (which may be a contactless pick-up), which is attached to the distributor 50 to detect the ignition time of each cylinder of the internal combustion engine 100. Two protrusions are provided on the opposite sides of a rotary disk 2a mounted on a crank shaft. These protrusions correspond to the top dead centers of the pistons of the internal combustion engine. The first waveform shaping circuit 5 generates an output with a waveform as shown in FIG. 12(A). The distributor 50 is provided with a centrifugal governor and a diaphragm, and its advance angle characteristic is set at MBT. Therefore, the signal from the point 1a causes an ignition at MBT.

The reference numeral 21 designates a clock circuit comprising an oscillator circuit using a crystal vibrator of 400 kHz, a counter for frequency division and a logic circuit. Clock signals $C_1$, $C_2$, $C_3$ and $C_4$ are supplied to each circuit. A knocking discrimination circuit 22 yields an analog output proportional to the knocking intensity $$(K|G|/\int_0^{T_1}|G|dt/T_1)$$

or $$(\int_0^{T_2}|G|dt/K\int_0^{T_1}|G|dt)$$

as described before. The structure of the circuit 22 is shown by a part surrounded by a two-points chain 22 in FIGS. 1 and 5.

The reference numeral 23 designates a retard angle setting circuit whose detailed circuit is shown in FIG. 9. Numeral 231 denotes an 8-bits A/D converter using MN5120 of Micronetwork Co., Ltd. (USA), the input of which is connected to the output of the knocking discrimination circuit 22. The clock (CL) input and the start convert (S·C) signal are connected to the output of an inverter 233 and the output of an inverter 234 respectively. The 8-bit outputs $A_8$, $A_7$, $A_6$, $A_5$, $A_4$, $A_3$, $A_2$ and $A_1$ are connected to a memory 235 in this order. To the input of the inverter 233 a clock signal $C_1$ is applied. To the clock (CL) input of a counter 232 attached with a dividing function, a clock signal $C_1$ is applied. The reset (R) and a clock enable (CE) terminals are grounded. The outputs "1" and "0" are connected to the input of the inverter 234, and the clock input of the memory 235 respectively. For the counter 232, CD4017 of RCA Co., Ltd. is used. For the memory 235, two CD4035 and two CD4050 of RCA Co., Ltd. are used. The memory receives an input at a rise of the clock signal, while it holds data and sends it to its outputs during other periods. The 8-bit outputs of the memory 235 are connected to the inputs $B_8$, $B_7$, $B_6$, $B_5$, $B_4$, $B_3$, $B_2$ and $B_1$ of a read only memory (ROM) 236 having 8-bit inputs and 8-bit outputs. For the ROM 236, two PROM 3621 of Intel Co., Ltd. are used to form 8-bit inputs and 8-bit outputs. The outputs $D_8$, $D_7$, $D_6$, $D_5$, $D_4$, $D_3$, $D_2$ and $D_1$ of the ROM 236 become outputs of the retard angle setting circuit 23.

Figure 10:
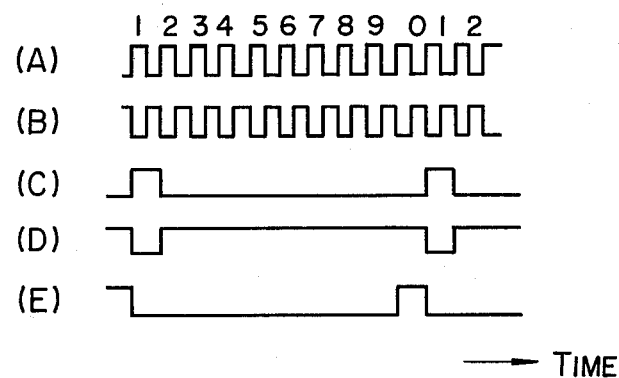

The operation of the above construction will now be explained with reference to FIG. 10. The decimal counter 232 with a dividing function starts to count when the clock signal $C_1$ (100 kHz) enters. At the first clock pulse, a pulse appears at the output terminal "1", and at the tenth clock pulse a pulse appears at the output terminal "0". At the eleventh clock pulse, a pulse appears again at the output terminal "1". If we assume that the clock signal $C_1$ is given by (A) of FIG. 10, the waveform of the output terminal "1" becomes as shown in FIG. 10(C). Hence, the output of the inverter 234 becomes as shown in FIG. 10(D) and the waveform of the output terminal "0" as shown in FIG. 10(E). The output of the inverter 233 is given by a waveform as shown in FIG. 10(B). Thus, the A-D converter 231 starts A-D conversion of the analog input to a digital value from a rise of FIG. 10(D) and finishes it at a point shown by an arrow. At a rise of FIG. 10(E) a clock signal enters into the memory 235 to store an A-D converted binary code. Since in ROM 236 whose address is selected by the output of the memory 235, the value of retard angle calculated from a rise of the point signal shown in FIG. 12(A) is preliminarily programmed, a digitial signal of retard angle proportional to the knocking intensity is generated by ROM 236. Under the condition that the analog output of the knocking discrimination circuit 22 is below a certain definite value and that knocking is not occurring in the internal combustion engine, ROM 236 is so programmed that the value of the retard angle is zero.

Figure 11:
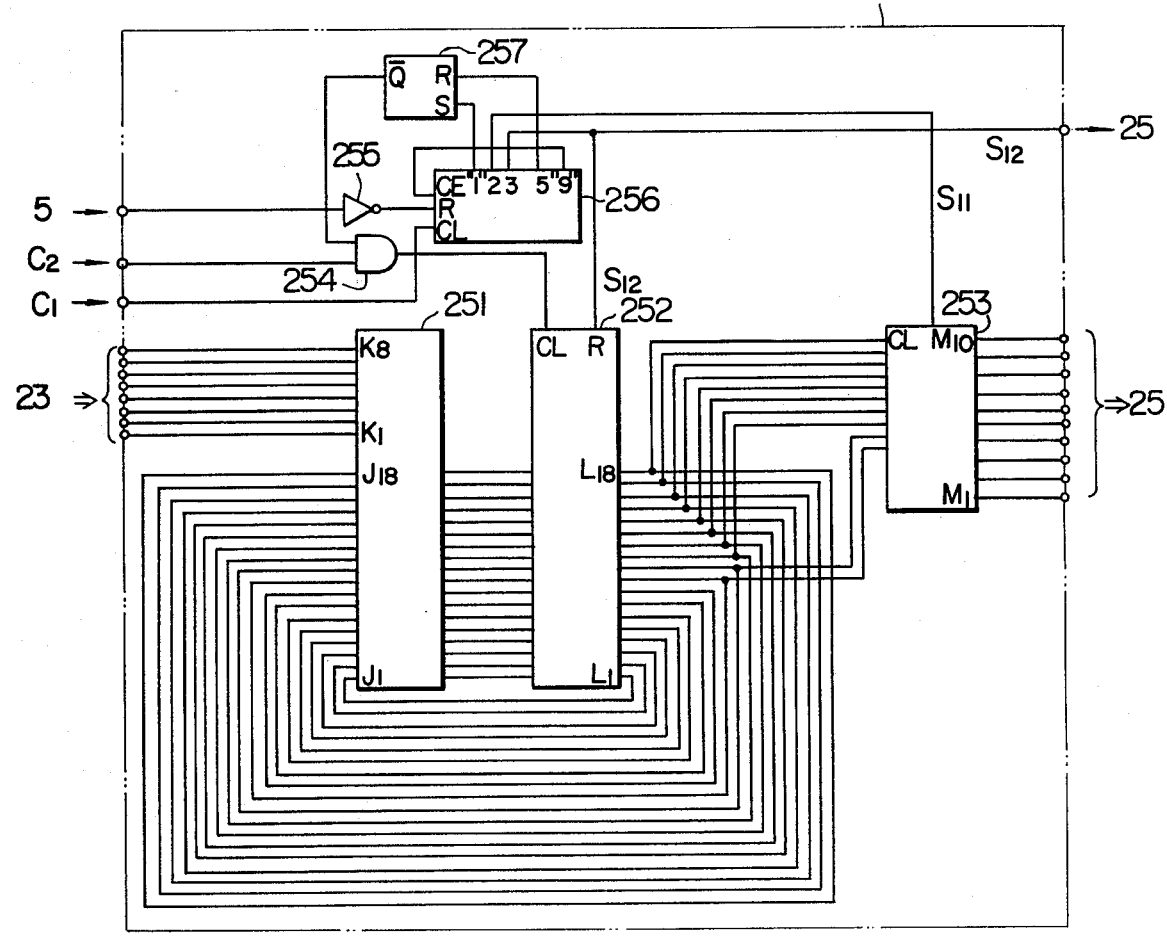

The reference numeral 24 designates a multiplier circuit whose detailed circuit is as shown in FIG. 11. This multiplier circuit 24 comprises a parallel adder 251 (CD4008 of RCA Company), memories 252 and 253 (CD4035 of RCA Company), an AND gate 254, an inverter 255, a counter 256 attached with a dividing function and an R-S flip-flop 257. Outputs $L_{18}$ to $L_1$ of the memory 252 are connected to inputs $J_{18}$ to $J_1$ of the parallel adder 251. Binary codes at the outputs $D_8$ to $D_1$ of the afore-mentioned retard angle setting circuit 23 are applied to inputs $K_8$ to $K_1$ of the parallel adder 251. The counter 256 stops counting after the number of clock signals becomes 9. The input and the output of the inverter 255 are connected to the output of the first waveform shaping circuit 5 and a reset terminal of the counter 256 respectively. The set and reset terminals of the R-S flip-flop 257 are connected to the output "1" and "5" of the counter 256 respectively. To one input of the AND gate 254, the clock signal $C_2$ of 10 kHz from the clock circuit 21 is applied. To the clock input of the counter 256 with a dividing function attached, the clock signal $C_1$ is applied. To the other input of the AND gate 254, the Q output of the R-S flip-flop 257 is connected. Outputs $M_{10}$ to $M_1$ of the memory 253 are the outputs of the multiplier circuit 24.

Figure 12:
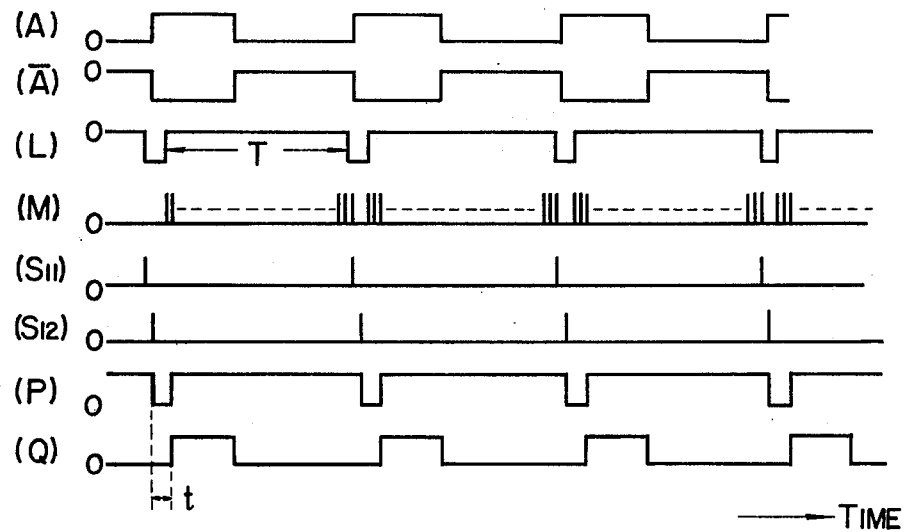

The operation of the above circuit construction will be explained next with reference to FIG. 12. The Q output of the R-S flip-flop 257 is set by the first pulse of the clock signal $C_1$ after the counter 256 is reset, and reset by a fifth output pulse, yielding a waveform as shown in FIG. 12(L). Thus, the output of the AND gate 254 consists of n pulses, as shown in FIG. 12(M), the pulse number being proportional to the time T. After the output of the waveform shaping circuit 5 has become "1", the clock signal $C_1$ is counted by the counter 256, which generates pulses as shown in FIGS. 12 ($S_{11}$) and ($S_{12}$) at its second and fourth outputs. Since the memory 252 is reset by the ($S_{12}$) pulse, the outputs $L_{18}$ to $L_1$ become all "0". Thereafter, every time a clock signal is supplied from the AND gate 254 as shown in FIG. 12(M), the outputs $L_{18}$ . . . $L_1$ changes as $K_8$ . . . $K_1$, $2 \times K_8$ . . . $K_1$, $n \times K_8$ . . . $K_1$. In response to the pulse shown in FIG. 12($S_{11}$), the memory 253 stores the upper 10 digits of the outputs $n \times K_8$ . . . $K_1$ for the outputs $M_{10}$ . . . $M_1$. Since the number n is proportional to T as mentioned before and $K_8$ . . . $K_1$ is a binary code, the multiplier circuit 24 yields in a binary code the output of retard angle $\theta$ multiplied by the time T, i.e. $T\theta$, where the time T is nearly equal to the period of the waveform shown in FIG. 12(A). The time T corresponds to the crank angle 180° at an engine revolution number. The retard time $T\theta$ is given by $T\theta = 1/180 \cdot \theta \times T$ because $\theta$:180 = $T\theta$:T. Since T is inversely proportional to the engine revolution number N, $T\theta \propto \theta \times 1/N$. Therefore, $T\theta$ represents a value of retard angle $\theta$ at a revolution number N as measured in unit time. Here, it is assumed that the frequency of the clock signal $C_2$ is 25.6 kHz. One period of the point signal for an engine revolution number of 3000 r.p.m. becomes 10 msec. Then, the number of clocks in this period is about 256. This means that the output value of the multiplier circuit 24 is equal to the input value. That is, if the input value is 00011000 (=6°), then the output value for the case of 3000 r.p.m. is 0000011000. In the case of 6000 r.p.m., the value becomes a half; 0000001100.

Figure 13:
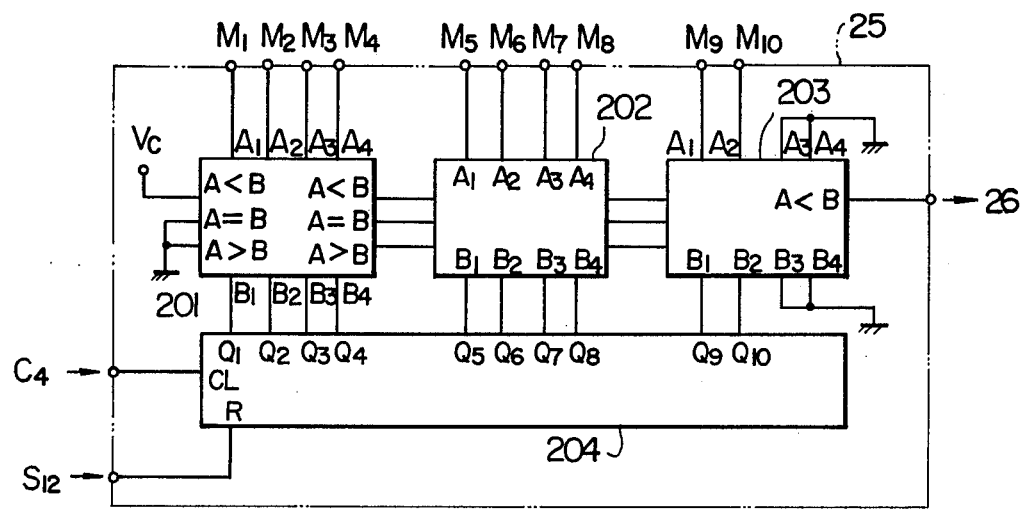

The reference numeral 25 designates a converter circuit whose circuit construction is as shown in FIG. 13. For comparators 201, 202, and 203, CD4063 of RCA Company is used in three parallel connection. Inputs $A_1$, $A_2$, $A_3$ and $A_4$ of the comparators 201 are connected in this order to the outputs $M_1$, $M_2$, $M_3$ and $M_4$ of the multiplier circuit 24. Input terminals A=B and A>B are grounded while to the input terminal A<B is supplied a voltage $V_c$. Inputs $B_1$, $B_2$, $B_3$ and $B_4$ are connected in this order to the outputs $Q_1$, $Q_2$, $Q_3$ and $Q_4$ of a counter 204. Outputs A<B, A=B and A>B are connected to the inputs A<B, A=B, A>B of the comparator 202 respectively. Inputs $A_1$, $A_2$, $A_3$ and $A_4$ of the comparator 202 are connected in this order to the outputs $M_5$, $M_6$, $M_7$ and $M_8$ of the multiplier circuit 24. Inputs $B_1$, $B_2$, $B_3$ and $B_4$ are connected in this order to $Q_5$, $Q_6$, $Q_7$ and $Q_8$ of the counter 204. Outputs A<B, A=B, and A>B are connected to the inputs A<B, A=B, and A>B of the next stage comparator respectively. Inputs $A_1$ and $A_2$ of the comparator 203 are connected in this order to the outputs $M_9$ and $M_{10}$ of the multiplier circuit 24, while $A_3$ and $A_4$ terminals are grounded. Inputs $B_1$ and $B_2$ are connected to the outputs $Q_9$ and $Q_{10}$ of the counter 204 respectively, while $B_3$ and $B_4$ terminals are grounded. The terminal A<B yields an output of the converter circuit 25. To the clock terminal CL of the counter 204 is connected the clock signal $C_4$ from the clock circuit 12. The reset terminal R is connected to the output 4 of the counter attached with a divider 256 in the multiplier circuit 24.

The operation of the above circuit construction is as follows. By the pulse $S_{12}$ from the output 4 of the counter 256 in the multiplier circuit 24, the counter 204 is reset. As a result, the outputs $Q_{10}$ to $Q_1$ are all "0". Next, while the clock signal $C_4$ is counted, when the binary code value $Q_{10}$ . . . $Q_1$ of the counter 204 becomes equal to or larger than the binary code $M_{10}$ . . . $M_1$, the output A<B of the comparator 203 changes from "0" to "1" as shown in FIG. 12(P). Thus, the converter circuit 25 converts a binary code to a pulse width. Here, it is assumed that the clock signal $C_4$ entering the converter circuit 25 has a frequency of 72 kHz. In this case, if the value $M_{10}$, $M_9$ . . . $M_1$ for an engine revolutions number of 3000 r.p.m. becomes 0000011000 (=24), the output of the converter circuit 25 or the retard time t shown in FIG. 12(Q) becomes $24 \times 1 \approx 7200 = 0.333$ msec. Since one period of the point signal corresponds to 180° for the case of 3000 r.p.m., a crank angle of 6° corresponds to 0.333 msec. because 180°:10 msec=6°:0.333 msec.

Since the inputs of the AND circuit 26 are connected to the output of the first waveform shaping circuit 5 and the output of the converter circuit 25, its output has a waveform as shown in FIG. 12(Q).

The reference numeral 27 designates an ignitor, which power amplifies the output signal of the AND gate 26 and drives an ignition coil 40 by a power battery 28. Since this ignition circuit is publicly well known, no explanation of it will be made. When the signal shown in FIG. 12(Q) rises from "0" to "1", the ignitor 27 cuts off the current flowing through the ignition coil 40 and ignites the ignition plug through the distributor 50. The difference time t between the rise of the signal of FIG. 12(A) and the rise of the signal of FIG. 12(Q) corresponds to the retard time, or the retard angle. When the retard angle is 0°, t is 0. In such a case, ignition occurs at the rise of the signal shown in FIG. 12(A), i.e. at MBT.

As described above, according to this invention, using the knocking discrimination circuit 22, the value of retard angle from MBT can be programmed in response to a signal proportional to the knocking intensity. Therefore, it is possible to increase the retard angle in proportion to the output of the knocking discrimination circuit 22.

Although, in the above embodiments, the retard angle was programmed by ROM 236, it is needless to say that other methods may be employed. For example, by frequency modulation by the output of the memory 235 of the retard angle setting circuit 23 and choosing the modulated frequency as the clock input of a counter (not shown), an output corresponding to the retard angle is obtained from the counter.

Although, in the above embodiments, the ignition timing for MBT was obtained by a mechanical type advance angle means provided at the distributor 5, it is possible to use an electronic type advance angle means to correct the ignition timing for MBT in accordance with the knocking intensity.

Furthermore, although, in the above embodiments, vibration of the internal combustion engine was directly detected from the acceleration of vibration, it may be indirectly detected from the internal pressure of a cylinder on the sound of an engine.

As described above, according to this invention, since the knocking output generated has a value corresponding to the ratio between the average value of vibration within a prescribed crank angle before the top dead center and the peak output of vibration or the average value of vibration within a prescribed crank angle after the top dead center, an output proportional to the knocking intensity can be obtained. Furthermore, by variably setting the lag of ignition timing in accordance with the output value proportional to the knocking intensity, the ignition timing can be controlled in response to the knocking intensity. Thus, the invention has an excellent effect of suppressing the knocking level sensed by auditory sense and adjusting the ignition advance angle at an optimum value from a viewpoint of knocking.

We claim:

1. A method for controlling ignition spark timing for an internal combustion engine having an output shaft rotated by a piston, the method comprising the steps of:

monitoring the magnitude of vibration of said engine by vibration responsive means coupled to said engine;

integrating said magnitude of vibration during a predetermined interval of rotation of said output shaft before arrival of a piston of said engine at the top dead center position;

integrating a predetermined magnitude during said predetermined interval of rotation of said output shaft;

dividing the output of said former integrating step by the output of said latter integrating step;

holding said division output of said former dividing step after an arrival of said piston to the top dead center position;

dividing said monitored magnitude of vibration by a holding output of said former holding step; and holding said division output of said latter dividing step at the same time as said former holding step; and controlling ignition spark timing supplied to said engine in response to a holding output of said latter holding step.

2. A method for controlling ignition spark timing for an internal combustion engine having an output shaft rotated by a piston, the method comprising the steps of:

monitoring the magnitude of vibration of said engine by vibration responsive means coupled to said engine;

integrating said magnitude of vibration during a predetermined interval of rotation of said output shaft before an arrival of a piston of said engine at the top dead center position;

integrating a predetermined magnitude during said predetermined interval of rotation of said output shaft;

dividing the output of said former integrating step by the output of said latter integrating step;

holding said division output of said former dividing step;

integrating said magnitude of vibration during a predetermined interval of rotation of said output shaft after an arrival of said piston at the top dead center position;

dividing the output of said last-named integrating step by an output of said former holding step;

holding said division output of said lattter dividing step after a completion of said last-named integrating step; and controlling ignition spark timing supplied to said engine in response to an output of said latter holding step.

3. A method for controlling ignition spark timing for an internal combustion engine having an output shaft rotated by a piston, the method comprising the steps of:

establishing a desired ignition spark timing in response to operating conditions of said engine;

monitoring the magnitude of vibration of said engine;

establishing a reference magnitude of vibration in response to said magnitude of vibration monitored by said monitoring step before an arrival of said piston to the top dead center position;

dividing said magnitude of vibration monitored by said monitoring step after an arrival of said piston to the top dead center position by said reference magnitude;

deriving a maximum value of a division output of said dividing step;

retarding said desired ignition spark timing in relation to said maximum value of said deriving step; and repeating all of said steps at every predetermined angular interval of rotation of said output shaft.

4. A method for controlling ignition spark timing for an internal combustion engine having an output shaft rotated by a piston, the method comprising the steps of:

establishing a desired ignition spark timing in response to operating conditions of said internal combustion engine;

monitoring the magnitude of vibration of said engine;

establishing a reference magnitude of vibration in response to said magnitude of vibration monitored before an arrival of said piston to the top dead center position;

integrating, after an arrival of said piston to the top deal center position, said magnitude of vibration monitored by said monitoring step;

dividing an output of said integrating step by said reference magnitude of vibration;

retarding said desired ignition spark timing in relation to an output of said dividing step; and repeating all of said steps at every predetermined angular interval of rotation of said output shaft.

* * * * *